No. 766,773. PATENTED AUG. 2, 1904.
R. H. SCOTT.
BRACE FOR WHEELS.
APPLICATION FILED MAR. 15, 1904.
NO MODEL.
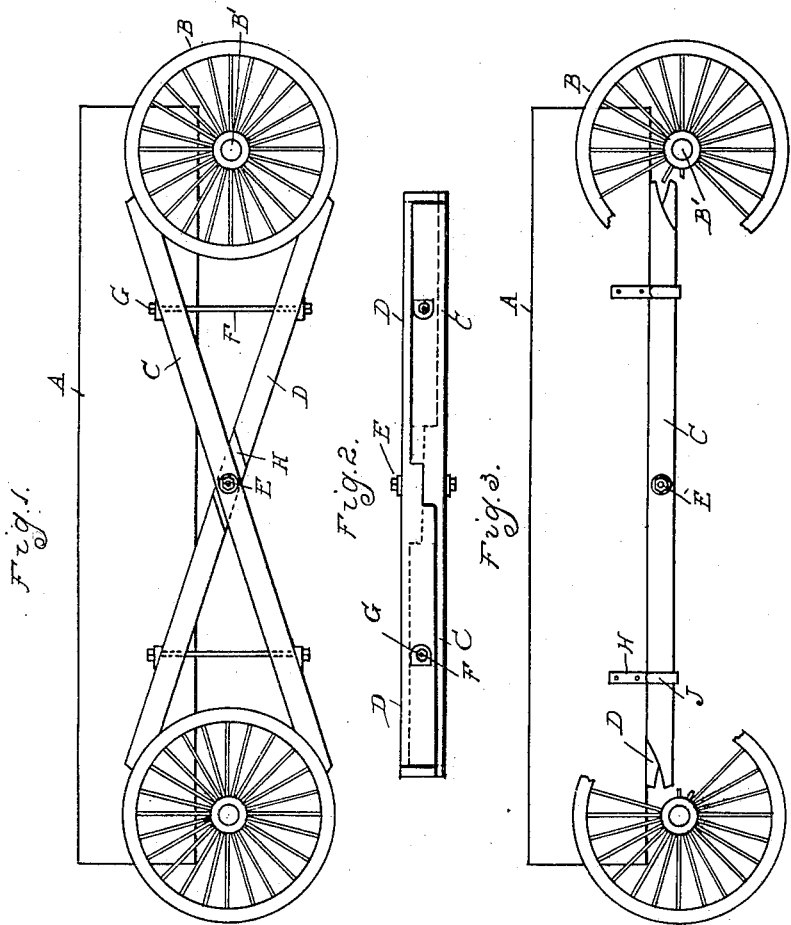
Witnesses
Inventor
Richard H. Scott
By James Whittmore
Atty.

No. 766,773.

Patented August 2, 1904.

UNITED STATES PATENT OFFICE.

RICHARD H. SCOTT, OF LANSING, MICHIGAN, ASSIGNOR TO OLDS GASOLINE ENGINE WORKS, OF LANSING, MICHIGAN, A CORPORATION OF MICHIGAN.

BRACE FOR WHEELS.

SPECIFICATION forming part of Letters Patent No. 766,773, dated August 2, 1904.

Application filed March 15, 1904. Serial No. 198,250. (No model.)

*To all whom it may concern:*

Be it known that I, RICHARD H. SCOTT, a citizen of the United States, residing at Lansing, in the county of Ingham and State of Michigan, have invented certain new and useful Improvements in Braces for Wheels, of which the following is a specification, reference being had therein to the accompanying drawings.

The invention relates to new and useful improvements in braces for wheels; and it consists particularly in the construction of a frame adapted to lock the front and rear wheels of a vehicle from turning, the frame in the construction which I have shown comprising two crossing-bars pivoted together, each of a length to reach from a point above the line of the axle on one wheel to a point below the line of the axle of the other wheel, with means for clamping the bars upon the wheels, so as to lock them from rotation.

The invention further consists in the peculiar construction, arrangement, and combination of the various parts, as more fully hereinafter described.

In the drawings, Figure 1 is a side elevation of a vehicle, showing my improved brace applied thereto. Fig. 2 is a plan view of the brace detached. Fig. 3 is a side elevation of the vehicle, showing the brace stored in position beneath the vehicle, as when not in use.

At the present time gas-engines are manufactured for farm use, and in some cases these gas-engines are placed on wheels or on wagons or trucks. When it is desired to use these engines thus supported on trucks or on a vehicle for driving stationary machinery, it is desirable and, in fact, necessary to lock the vehicle against movement, and the device which I have herein shown is especially intended for locking wheels of a vehicle carrying an engine.

A represents the vehicle-body, B the wheels, and B' the axles, and this vehicle may carry, if desired, a gas-engine for power purposes, which I have not shown for the reason that the device may be used equally well for locking the wheels of vehicles upon which no engine is applied.

The lock consists of the two bars C and D, which are pivoted together at their middle by a cross-bolt E, and at each side of the middle they are apertured to receive the clamping-bolts F, which have suitable nuts G to be used in effecting the clamping of the device upon the wheels. At the intersecting points of the two bars I preferably provide gains H, so that the two bars will overlap each other, and thus both will readily clamp upon the tire of the wheel.

The device being thus constructed, its use is as follows: When it is desired to lock the wheels, the nuts G are loosened sufficiently to open the bars into the position shown in Fig. 1, each bar extending from a point above the line of the axle on one wheel to a point below the line of the axle on the other wheel, pivoting on the bolt E. When thus arranged, they are tightly clamped upon the wheels by turning up the nuts G, which through the medium of the bolts F will clamp both front and rear wheels and prevent them from turning and at the same time act as a brace between these wheels to keep the vehicle steady. It will be observed that the entire device is supported on the wheels, so that it can be readily applied or detached. When the device is not in use, it is removed, and I can support it beneath the vehicle in any desired manner—for instance, by means of the hook-bars J on the sides of the wagon-body, having hooks which project beneath the body to support the frame, as shown in Fig. 3.

What I claim as my invention is—

1. A lock for vehicle-wheels comprising two substantially rigid bars adapted to extend from the front to the rear wheels and to rest thereagainst, of adjusting means connecting the two bars for drawing the same together at the end to forcibly position the ends of the bars against the periphery of the wheels.

2. A lock for vehicle-wheels comprising two substantially rigid bars adapted to extend from the front to the rear wheels and to be supported solely by the wheels, and means connecting the two bars for drawing the ends thereof together and clamping the same on the wheels.

3. A lock for vehicle-wheels comprising two crossed bars pivoted together of a length to extend from the front to the rear wheel, and to rest on said wheels above and below the axles thereof, and means for causing said bars to be clamped upon the wheels.

4. A lock for vehicle-wheels comprising two crossed bars gained into each other at the crossing-point, and pivoted together and bolts for drawing the ends of the bars together.

In testimony whereof I affix my signature in presence of two witnesses.

RICHARD H. SCOTT.

Witnesses:
JAMES B. SEAGER,
F. A. WALL.